(12) United States Patent
Bolzacchini

(10) Patent No.: US 9,622,491 B2
(45) Date of Patent: Apr. 18, 2017

(54) AUTOMATIC STUFFING MACHINE FOR FOOD PRODUCTS

(71) Applicant: INOX MECCANICA S.R.L., Goito, Franzione Solarolo (IT)

(72) Inventor: Giovanni Bolzacchini, Goito (IT)

(73) Assignee: INOX MECCANICA S.R.L., Goito Frazione Solarolo (IT)

( * ) Notice: Subject to any disclaimer, the term of this patent is extended or adjusted under 35 U.S.C. 154(b) by 0 days.

(21) Appl. No.: 15/085,983

(22) Filed: Mar. 30, 2016

(65) Prior Publication Data

US 2016/0286828 A1     Oct. 6, 2016

(30) Foreign Application Priority Data

Apr. 1, 2015   (IT) .............................. VR2015A0052

(51) Int. Cl.
| A22C 11/00 | (2006.01) |
| A22C 11/02 | (2006.01) |
| B65B 9/15 | (2006.01) |
| B65B 25/00 | (2006.01) |
| B65B 3/12 | (2006.01) |

(52) U.S. Cl.
CPC ........ *A22C 11/0227* (2013.01); *A22C 11/005* (2013.01); *A22C 11/0218* (2013.01); *B65B 3/12* (2013.01); *B65B 9/15* (2013.01); *B65B 25/001* (2013.01)

(58) Field of Classification Search
CPC ..... A22C 11/00; A22C 11/02; A22C 11/0209; A22C 11/0218; A22C 11/04
USPC ................................... 452/30–35, 45–48, 51
See application file for complete search history.

(56) References Cited

U.S. PATENT DOCUMENTS

| 4,955,109 | A * | 9/1990 | Evans ..................... A22C 11/02 452/35 |
| 6,572,464 | B1 | 6/2003 | Hergott et al. |
| 7,441,386 | B2 * | 10/2008 | Pinto ...................... B65B 51/04 452/48 |
| 9,314,035 | B2 * | 4/2016 | Krompholz ............ A22C 11/02 |

(Continued)

FOREIGN PATENT DOCUMENTS

| FR | 2 160 734 A1 | 7/1973 |
| FR | 2 614 602 A1 | 11/1988 |

OTHER PUBLICATIONS

Italian Search Report for IT VR2015A000052 dated Jan. 12, 2016.

*Primary Examiner* — Richard Price, Jr.
(74) *Attorney, Agent, or Firm* — Koppel, Patrick, Heybl & Philpott

(57) ABSTRACT

An automatic stuffing machine for food products, which comprises a base framework that supports at least one forming die of the product to be stuffed and a pusher adapted to cause the translation of the formed product through a stuffing tube; the machine has at least one tube changer body that supports at least two stuffing tubes and is actuated to move in order to bring, in each instance, one of the stuffing tubes to a working position, in which it is located substantially at the area of action of the pusher; furthermore elements are provided for removable joining between the forming die and the stuffing tube in the working position which are adapted to pass from an active condition, in which they provide a connection between the forming die and the stuffing tube in the working position, to an inactive condition.

15 Claims, 13 Drawing Sheets

(56) References Cited

U.S. PATENT DOCUMENTS

| | | | |
|---|---|---|---|
| 2001/0011005 A1* | 8/2001 | Bolzacchini | A22C 11/02 452/22 |
| 2008/0311835 A1* | 12/2008 | Nakamura | A22C 11/0218 452/33 |
| 2014/0235150 A1* | 8/2014 | Niedecker | A22C 11/0209 452/37 |
| 2015/0164094 A1* | 6/2015 | Bolzacchini | A22C 11/02 452/35 |

* cited by examiner

AUTOMATIC STUFFING MACHINE FOR FOOD PRODUCTS

The present invention relates to an automatic stuffing machine for food products.

Stuffing machines are known which are capable of inserting automatically a food product, typically constituted by a pre-shaped piece of meat, within a wrapping tubular casing, such as a gut casing or an elastic net, which is closed at its ends by means of clips.

In particular, these machines usually have a framework that supports a die for forming the product and a pusher that translates the product, after forming, through a stuffing tube, on which a tubular casing is fitted which is clipped at its front end, until the product exits from the stuffing tube, entraining the tubular casing, so that the product, by resting on a resting surface, is completely wrapped inside the tubular casing.

A clipping head arranged at the outlet of the stuffing tube applies two clips to the rear end of the tubular casing and cuts such casing in an intermediate region between the two clips.

In traditional machines there is a single stuffing tube, which is fixed detachably to the framework of the machine, so as to allow its manual removal by an operator, when the tubular casing fitted thereon is depleted, and therefore allow its subsequent replacement with another stuffing tube already loaded with a new tubular casing.

It is evident that these operations for changing the stuffing tube entail a loss of production and a high use of labor.

A stuffing machine is known from FR2614602 which has a rotatable supporting drum for a plurality of stuffing tubes.

Such drum allows to replace the stuffing tube automatically, once the tubular casing has been depleted, by moving in each instance, by means of a rotation thereof, another stuffing tube on which a new tubular casing is loaded in the region of action of the pusher, therefore without requiring an intervention of the operator.

Although this solution is valid conceptually, it suffers the drawback that it does not ensure a sealed connection between the die and the stuffing tube, since in order to allow the rotary motion of the drum between the die and the drum there is a certain play, so that with the pressure applied by the pusher there can be a loss of product by seepage from the space that exists between the drum and the die.

The aim of the present invention is to obviate the drawback described above by providing an automatic stuffing machine for food products that allows to provide automatically both the operations for stuffing the product and the operations for changing the stuffing tube, with the assurance of a tight seal between the die and the stuffing tube, in order to avoid leaks of product.

Within this aim, an object of the invention is to provide an automatic stuffing machine for food products that is reliable and structurally simple.

Another object of the invention is to provide an automatic stuffing machine that is competitive also from a merely economic standpoint.

This aim, as well as these and other objects that will become better apparent hereinafter, are achieved by the automatic stuffing machine for food products, according to the invention, as defined in the appended claims.

Further characteristics and advantages will become better apparent from the description of some preferred but not exclusive embodiments of the machine, according to the invention, illustrated by way of nonlimiting example in the accompanying drawings, wherein.

Figure 1:
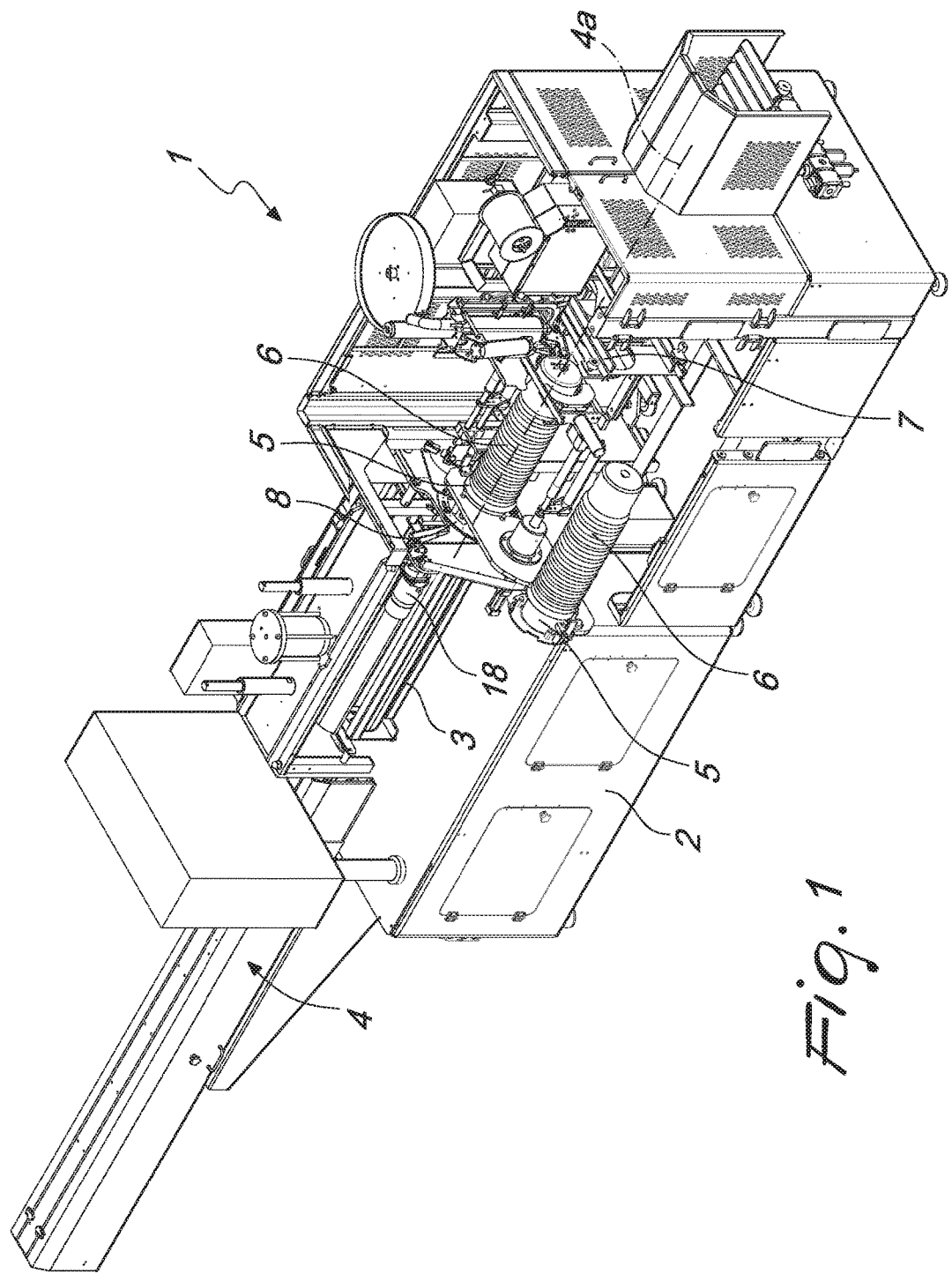
FIG. 1 is a perspective view of a machine according to the invention.

With reference to the figures, the automatic stuffing machine for food products, according to the invention, designated generally by the reference numeral 1, comprises a base framework 2, on which at least one forming die 3 for the product to be stuffed is mounted.

The basic framework 2 further supports a pusher 4, which is adapted to cause the translation of the product, after its forming in the die 3, along an advancement direction 4a, so that the formed product can pass through a stuffing tube 5, on the outer surface of which at least one tubular casing 6 is fitted which is intended to wrap around the product and is constituted for example by an elastic net, by a gut casing or the like.

More particularly, the pusher 4 is capable of causing the translation of the formed product until it exits from the stuffing tube 5, making it rest, completely wrapped in the tubular casing 6, on a resting surface 7 that is defined on the base framework 2.

As shown, the machine has at least one tube changer body 8, which supports at least two stuffing tubes 5 and can be moved, with respect to the base framework 2, in order to bring in each instance one of the stuffing tubes 5 into a working position, in which it is located at the region of action of the pusher 4, and at least one stuffing tube 5 to a resting position, in which loading of a new tubular casing 6 is allowed, for a subsequent operation for stuffing the product.

According to the invention, means are provided for detachable connection between the forming die 3 and the stuffing tube 5 arranged in the working position, which are adapted to pass from an active condition, in which they provide a continuous sealed connection, with respect to the product to be stuffed for example made into sausages, between the forming die 3 and the stuffing tube 5 arranged in the working position, to an inactive condition, in which they define a space between the forming die 3 and the stuffing tube 5 arranged in the working position, in order to allow the movement of the tube changer body 8 with respect to the base framework 2, thus allowing to bring another stuffing tube 5 to the working position, and vice versa.

In particular, advantageously there are means 9 for relative movement, along a direction that is substantially parallel to the direction of advancement 4a of the product, at least between at least one connecting portion of the stuffing tube 5 arranged in the working position and at least one connecting element 10 which is associated or associable with the forming die 3.

In particular, the relative movement means 9 allow to move the stuffing tube 5 arranged in the working position and the connecting element 10 from a mutually coupled condition, in which a continuous sealed connection is provided between the forming die 3 and the stuffing tube 5 arranged in the working position, to a mutual disengagement condition, with axial spacing of one with respect to the other, in order to allow the movement of the tube changer body 8 with respect to the base framework 2, so as to bring another stuffing tube 5 to the working position, and vice versa.

Advantageously, in the mutually coupled condition, at least one portion of the stuffing tube 5 that is in the working position and at least one portion of the connecting element 10 are inserted axially one inside the other, so as to ensure the best seal and avoid any possibility of product leakage.

Preferably, the tube changer body 8 is mounted so that it can rotate on the base framework 2 about a rotation axis 8a that is substantially parallel to the advancement direction 4a of the product and the stuffing tubes 5 are arranged around its rotation axis 8a.

The rotary motion of the tube changer body 8 with respect to the base framework 2 is provided by way of turning means 11, which are activated on command until a stuffing tube 5 is arranged in the working position.

Preferably, the connecting element 10 comprises a sleeve 12, which is, or is suitable to be, connected hermetically to the forming die 3 and is arranged substantially coaxially to the direction of advancement 4a of the product.

The sleeve 12 allows to provide in practice an interconnection between the forming die 3 and the stuffing tube 5 in the working position.

Figure 8:
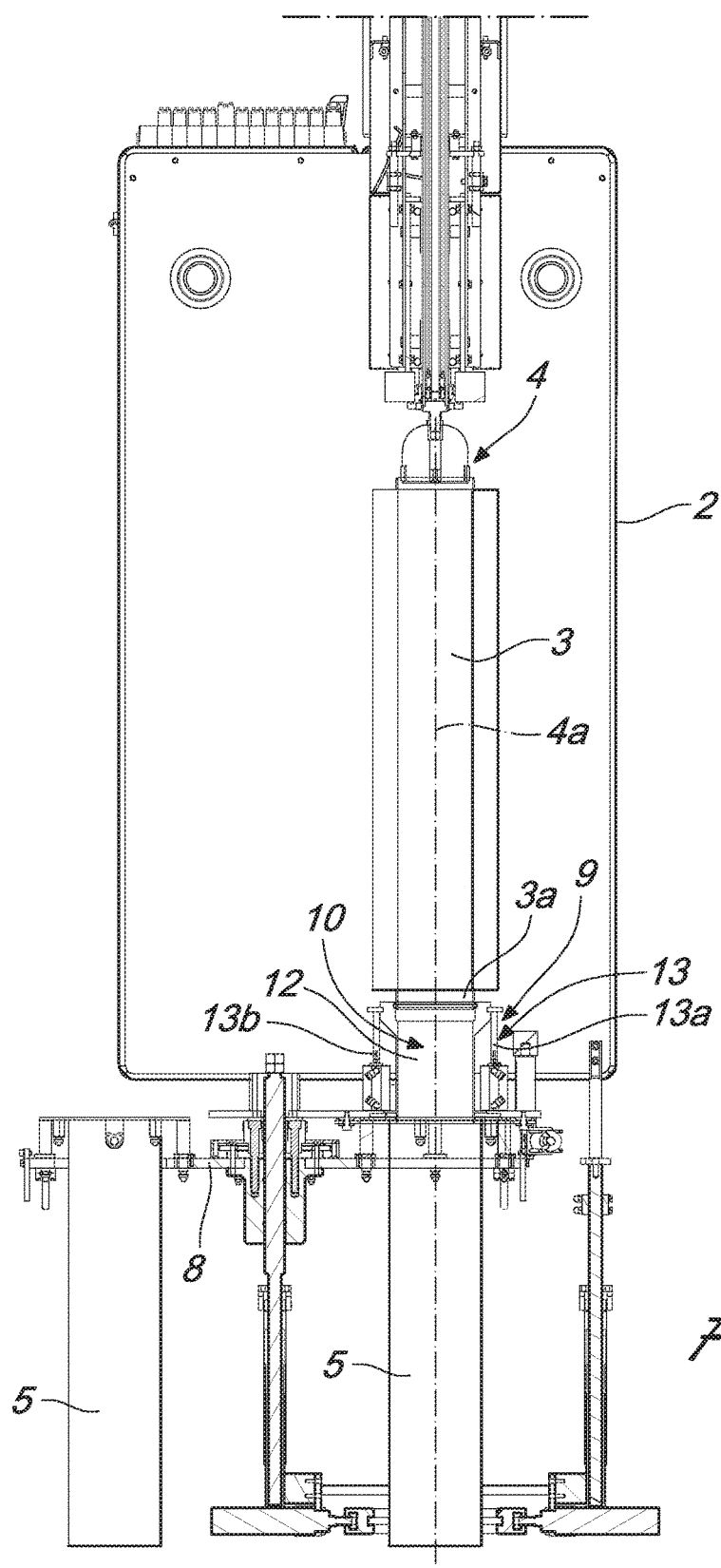
FIG. 8 is a sectional view, taken along a substantially horizontal plane, of a constructive variation of the machine according to the invention, with parts omitted or shown in phantom lines for the sake of simplicity.
Figure 9:
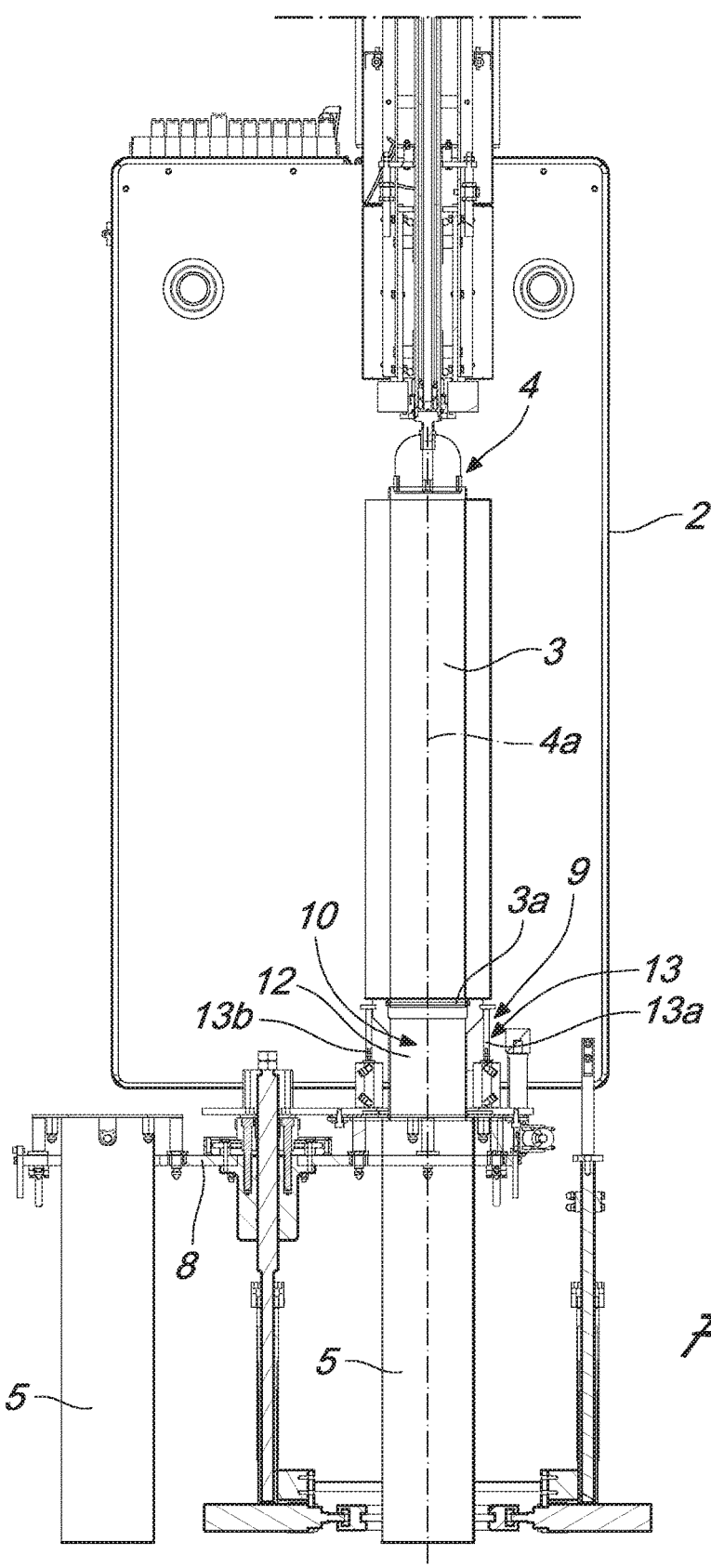
FIG. 9 is a view, similar to FIG. 8, with a sleeve shown in a position for disengagement from the stuffing tube in the working position.

According to a first embodiment, shown in FIGS. 8 and 9, the relative movement means 9 comprise means 13 for the axial translation of the sleeve 12 with respect to the forming die 3 along a direction that is substantially parallel to the advancement direction 4a of the product.

In particular, in this first embodiment the sleeve 12 is coupled hermetically to one end of the forming die 3 with the possibility to translate axially along the product advancement direction 4a, while the axial translation means 13 are constituted conveniently by a pair of movement cylinders 13a, 13b, which are adapted to produce an approach or spacing motion of the sleeve 12 with respect to the stuffing tube 5.

More particularly, in this embodiment the sleeve 12 can be for example fitted so that it can slide on a tubular portion 3a that is fixed coaxially to the forming die 3.

By way of the movement of the sleeve 12 provided by the movement cylinders 13a, 13b, toward or away with respect to the stuffing tube 5 that is in the working position, it is possible to shift between a condition of mutual coupling between the sleeve 12 and the stuffing tube 5 that is in the active position, with insertion of the sleeve 12 in the stuffing tube 5 in the active position, so as to provide a continuous sealed connection between the forming die 3 and the stuffing tube 5 in the working position, and a condition of mutual disengagement between the sleeve 12 and the stuffing tube 5 in the working position, with the consequent possibility to actuate rotationally the tube changer body 8 in order to bring another stuffing tube 5 to the working position.

According to another embodiment, which is currently preferred, the relative movement means 9 comprise means 14 for the axial movement of the tube changer body 8 with respect to the basic framework 2 along a direction that is substantially parallel to the product advancement direction 4a.

The axial movement means 14 allow to produce a movement in an axial direction of the tube changer body 8 and therefore of the stuffing tubes 5 with respect to the connecting element 10, so as to produce an approach of the stuffing tube 5 that is in the working position toward the connecting element 10, until the condition of mutual coupling between the stuffing tube 5 in the working position and the connecting element 10 is provided, consequently achieving a continuous sealed connection between the forming die 3 and the stuffing tube 5 in the working position.

Furthermore, the axial movement means 14 allow to move in an axial direction the tube changer body 8 also in the opposite direction, in order to cause the spacing of the stuffing tube 5 in the working position from the connecting element 10, so as to obtain mutual disengagement between the stuffing tube 5 in the working position and the connecting element 10 and thus allow the possibility to actuate again the tube changer body 8 of the stuffing tubes 5 in order to move another stuffing tube 5 to the working position.

It should be noted that, differently from the preceding embodiment, the sleeve 12 that provides the connecting element 10 can, in this case, be fixed to the base framework 2 or be integrally connected by the forming die 3.

Delving further into the details of this other embodiment, the tube changer body 8 is advantageously mounted so that it can rotate about a supporting shaft 15 that is arranged substantially parallel to the product advancement direction 4a.

In particular, the means 11 for turning the tube changer body 8 conveniently comprise a pulley 16, which is mounted rotatably on the supporting shaft 15 and is connected integrally in rotation to the tube changer body 8. The pulley 16 receives motion from a transmission element 17, such as for example a belt or chain, which is functionally connected to an actuation motor 18.

The tube changer body 8 is further mounted so that it can slide along the supporting shaft 15 and the axial movement means 14 are conveniently provided by one or more actuation cylinders 14a, 14b, which act between the tube changer body 8 and the base framework 2 in order to produce the sliding of the tube changer body 8 along the supporting shaft 15 toward or away from the pulley 16.

The movement actuated by the actuation cylinders 14a, 14b of the tube changer body 8 along the supporting shaft 15 causes the movement of the stuffing tube 5, which is in the working position, between the condition of mutual coupling with the connecting element 10 and the condition of mutual disengagement from the connecting element 10.

As shown, the actuation cylinders 14*a*, 14*b* are conveniently connected to the tube changer body 8 by means of a supporting ring 19, which defines, on its inner surface, a circular groove 19*a* that is engaged slidingly by an annular body 20, which in turn is fixed axially to the tube changer body 8 in order to allow the rotation of such tube changer body with respect to the supporting ring 19.

Advantageously, means for kinematic connection to the tube changer body 8 are associated with the pulley 16 and are constituted for example by one or more connection pins 21, which are fixed to the pulley 16 and have the function of connecting the tube changer body 8 to the pulley 16 in order to keep the tube changer body 8 integral with the pulley 16 in its rotary motion, though allowing the tube changer body 8 the possibility to slide with respect to the pulley 16 along the supporting shaft 15.

In particular, the connection pins 21 are extended substantially parallel to the axis of the supporting shaft 15 and are conveniently inserted slidingly in respective guiding channels 22 defined in the tube changer body 8.

Conveniently, when the stuffing tube 5 that is in the working position is moved into the condition of mutual coupling with the connecting element 10, it can be locked with respect to the base framework 2 by way of removable locking means 23.

More particularly, the removable locking means 23 can be activated on command once the stuffing tube 5 that is in the working position reaches the condition of mutual coupling with the connecting element 10.

In detail, the removable locking means 23 comprise a retention ring 24, which is arranged substantially coaxially to the product advancement direction 4*a* and is supported, so that it can rotate about its own axis, by a wall 25, which is fixed to the base framework 2. In particular, the wall 25 protrudes upwardly from the base framework 2 and is interposed between the forming die 3 and the stuffing tubes 5. In the illustrated embodiment, the wall 25 supports advantageously also the supporting shaft 15 and the actuation motor 18.

The retention ring 24 is provided internally with a plurality of engagement protrusions 26, which are mutually angularly spaced around the axis of the retention ring 24.

A respective flange 27 is fixed to each stuffing tube 5 and is provided, along its outer perimeter, with recesses 28 that can be crossed by the engagement protrusions 26 of the retention ring 24 and are alternated with raised portions 29.

Advantageously, the retention ring 24 can be actuated rotationally by actuator means 30, which act appropriately between the retention ring 24 and the wall 25.

Figure 4:
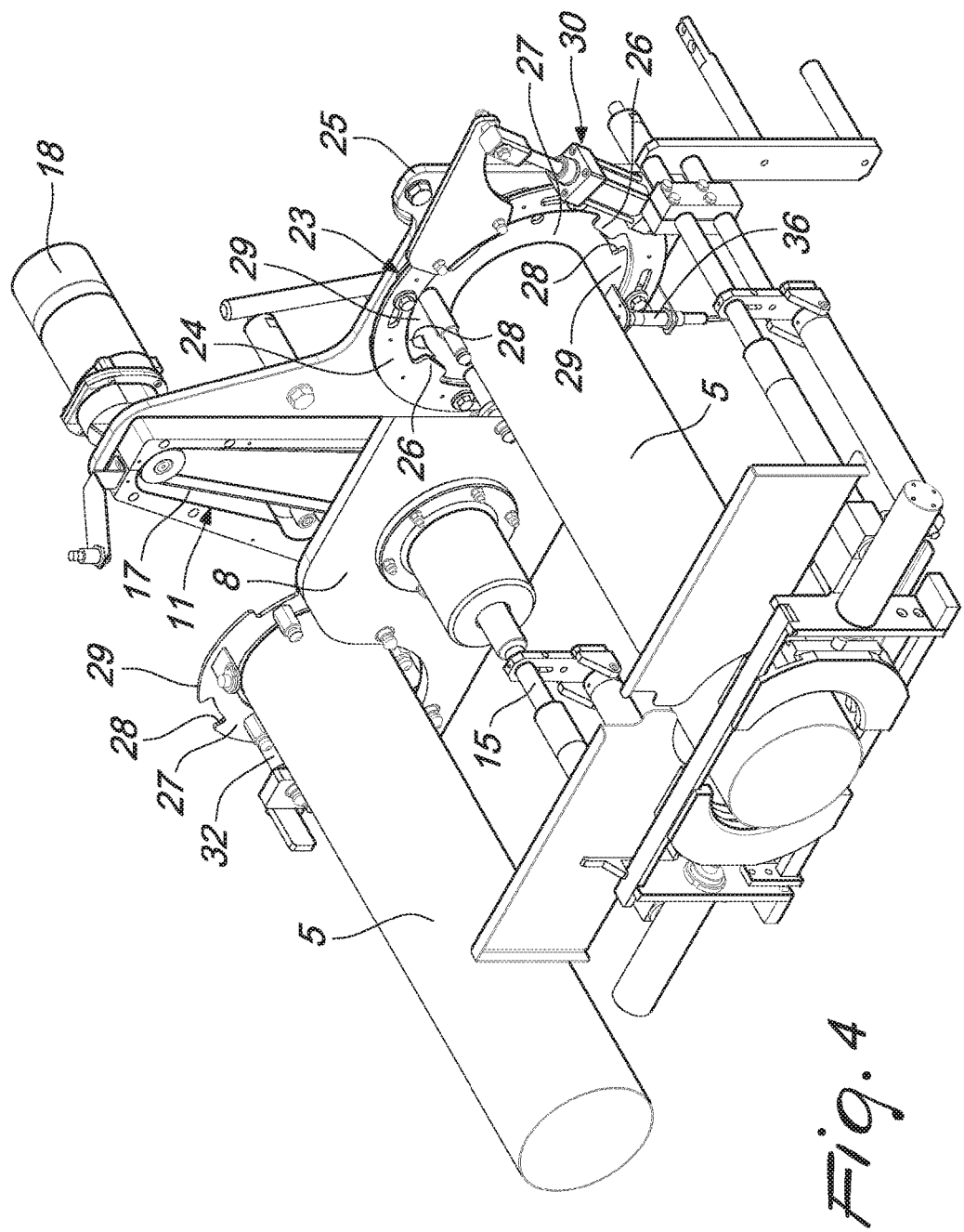
FIG. 4 is a perspective view of a portion of the machine according to the invention, with parts omitted for the sake of simplicity.
Figure 5:
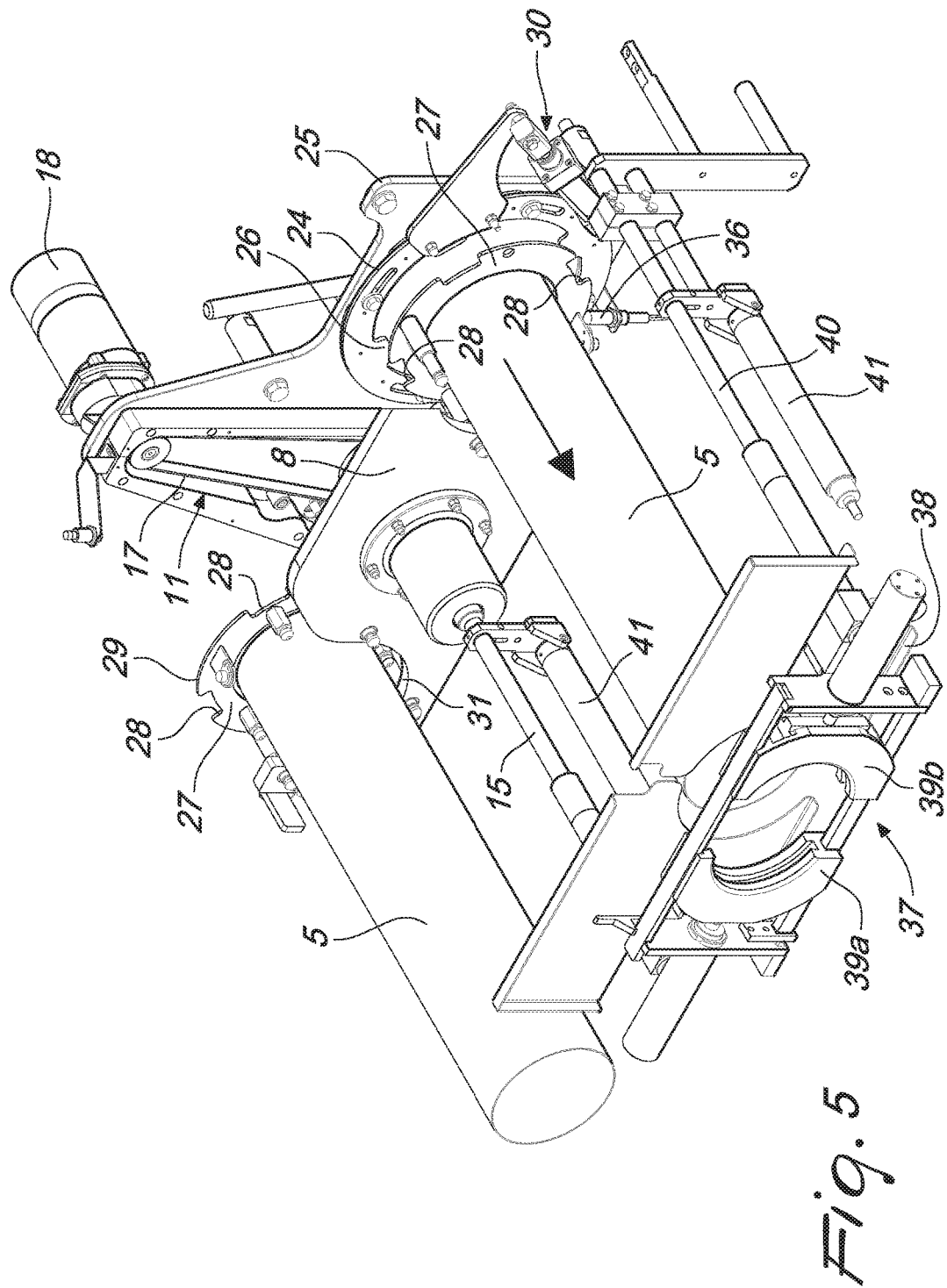
FIG. 5 is a perspective view of the portion of FIG. 4 of the machine according to the invention in a different operating situation, with parts omitted or shown in phantom lines.
Figure 6:
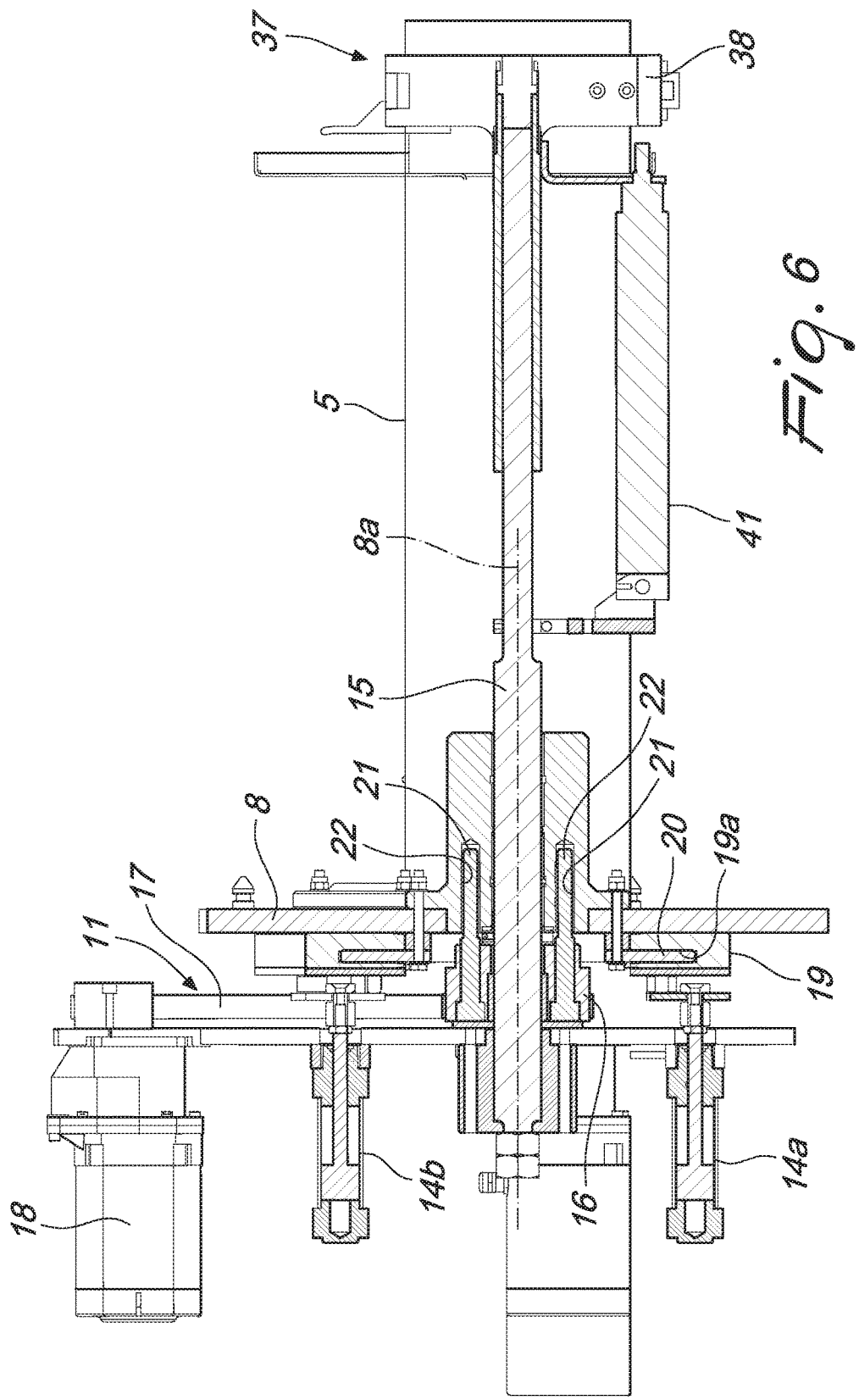
FIG. 6 is a sectional view, taken along a substantially vertical plane, of the portion of FIG. 4 of the machine according to the invention.
Figure 7:
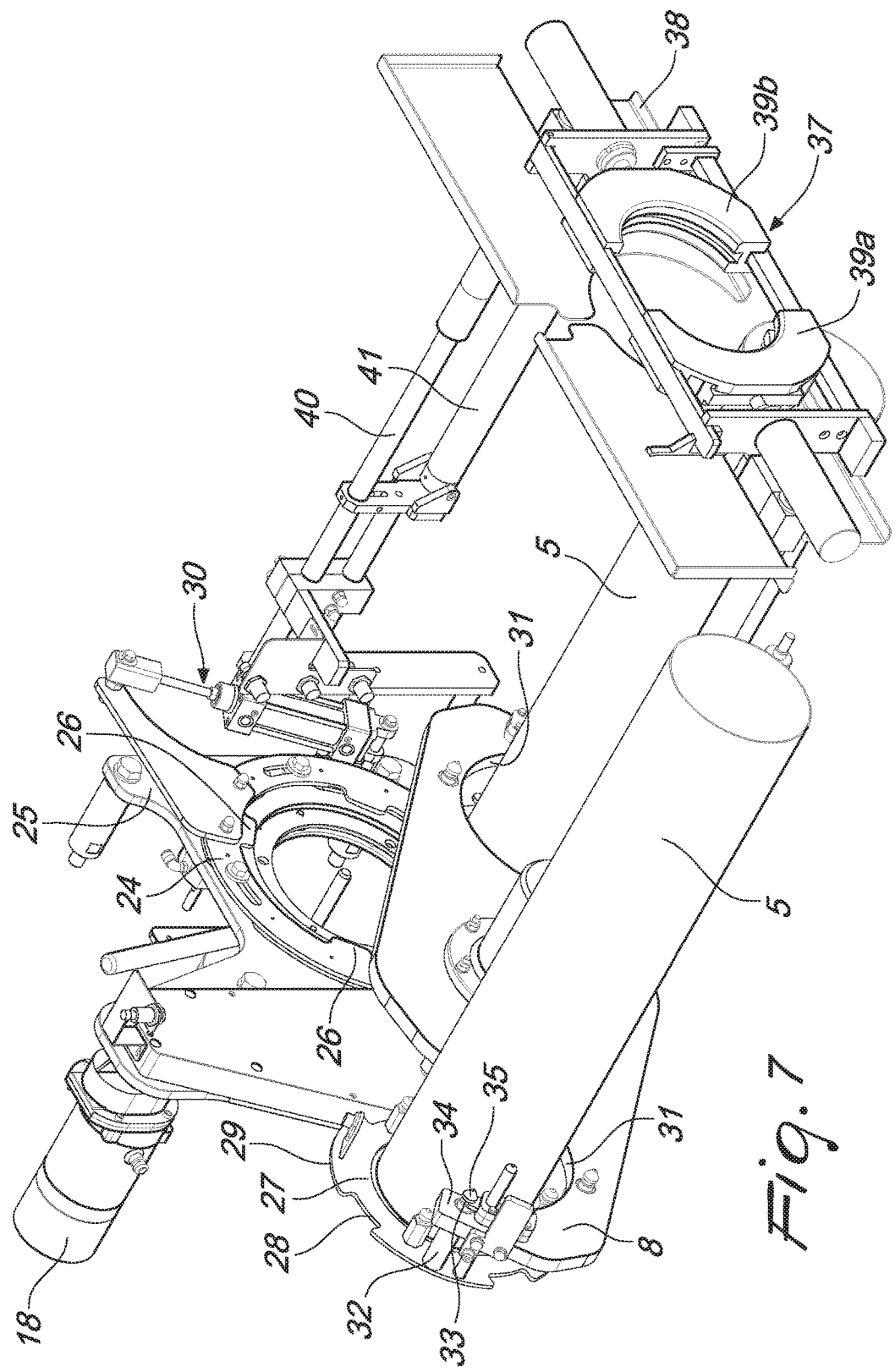
FIG. 7 is a perspective view of the portion of FIG. 4 of the machine according to the invention with a tube changer body shown in the rotation step.

In particular, by way of the rotation imparted by the actuation means 30, the retention ring 24 is capable of passing from a disengagement condition, shown in FIG. 5, in which its engagement protrusions 26 are arranged at the recesses 28, so as to allow translational motion, along a direction that is substantially parallel to the product advancement direction 4*a*, of the stuffing tube 5 that is arranged in the working position between the mutually coupled condition and the mutual disengagement condition with the connecting element 10, to an engagement condition, shown in FIG. 4, in which its engagement protrusions 26 are misaligned with respect to the recesses 28, so as to lock the flange 27 of the stuffing tube 5 that is in the working position between the retention ring 24 and the wall 25, once the stuffing tube 5 arranged in the working position is in the condition for mutual coupling with the connecting element 10.

Advantageously, the stuffing tubes 5 are coupled detachably to the tube changer body 8 in order to allow their replacement with another stuffing tube 5 that is loaded with a new tubular casing 6 when they are in the inactive condition.

In particular, for each stuffing tube 5 there is, on the tube changer body 8, a respective receptacle 31, which is open on one side in order to allow the passage of the corresponding stuffing tube 5.

The coupling of the stuffing tubes 5 to the tube changer body 8 at the corresponding receptacles 31 is provided conveniently by way of engagement pins 32, which are fixed to the flange 27 of the stuffing tubes 5 and are substantially parallel to such stuffing tubes.

The engagement pins 32 can be coupled detachably in respective locking seats 33 defined on the tube changer body 8. Advantageously, at the locking seats 33 there are removable locking means 34, which are adapted to engage a circular engagement hollow 35 that is provided on the engagement pins 32 in order to prevent their axial extraction from the locking seats 33.

Advantageously, there is also at least one sensor 36, which is adapted to detect the reaching of the working position by one of the stuffing tubes 5 as a consequence of the actuation in motion of the tube changer body 8 with respect to the base framework 2.

More particularly, the sensor 36 is functionally connected to the means 11 for turning the tube changer body 8 and more precisely to the actuation motor 18 so that it can command the halting of the turning means 11 of the tube changer body 8 when the working position is reached by one of the stuffing tubes 5.

Advantageously, there are also means 37 for braking the tubular casing 6 supported by the stuffing tube 5 that is in the working position.

Figure 2:
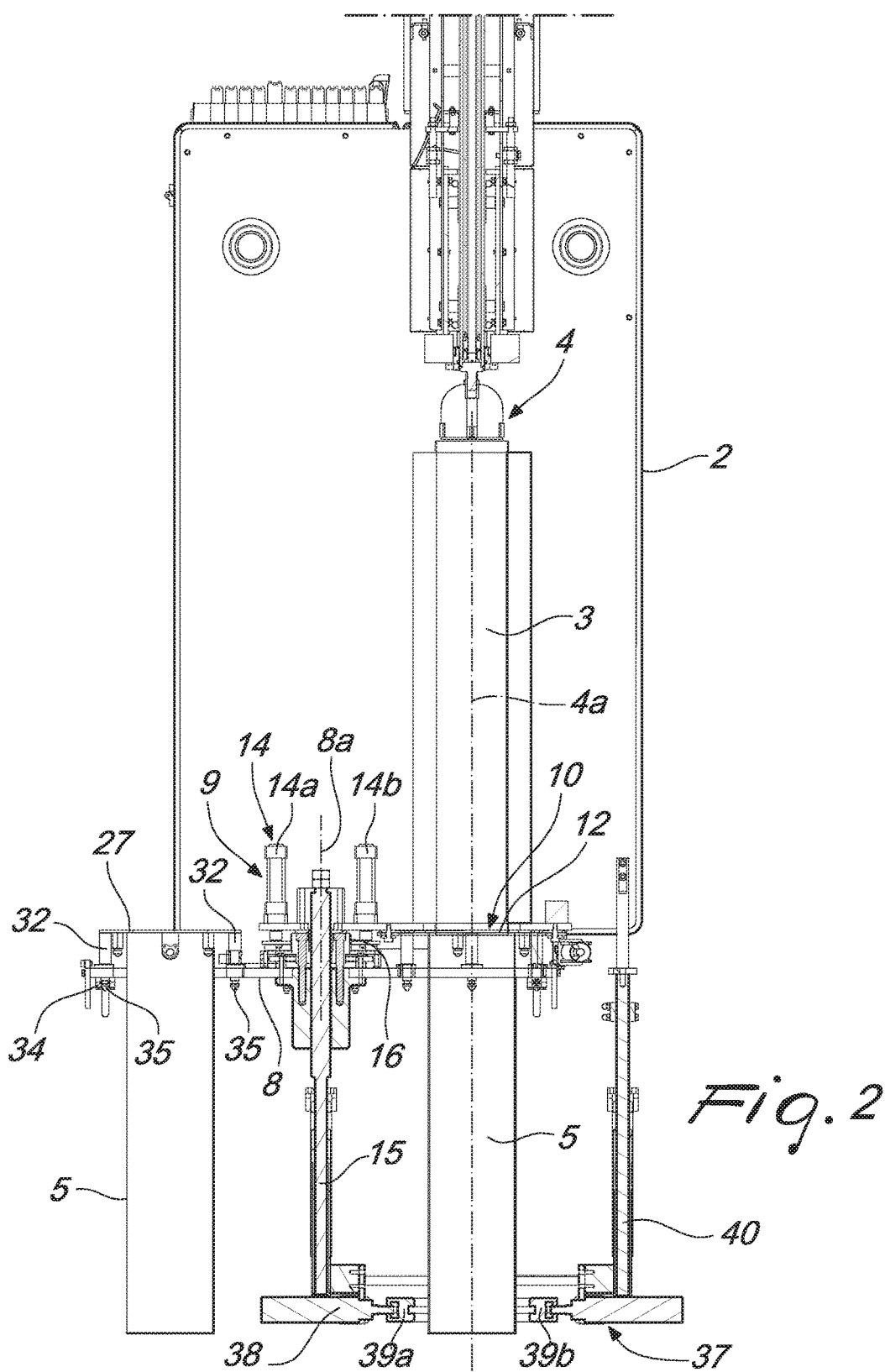
FIG. 2 is a schematic sectional view of the machine according to the invention, taken along a substantially horizontal plane, with parts omitted for the sake of simplicity.
Figure 3:
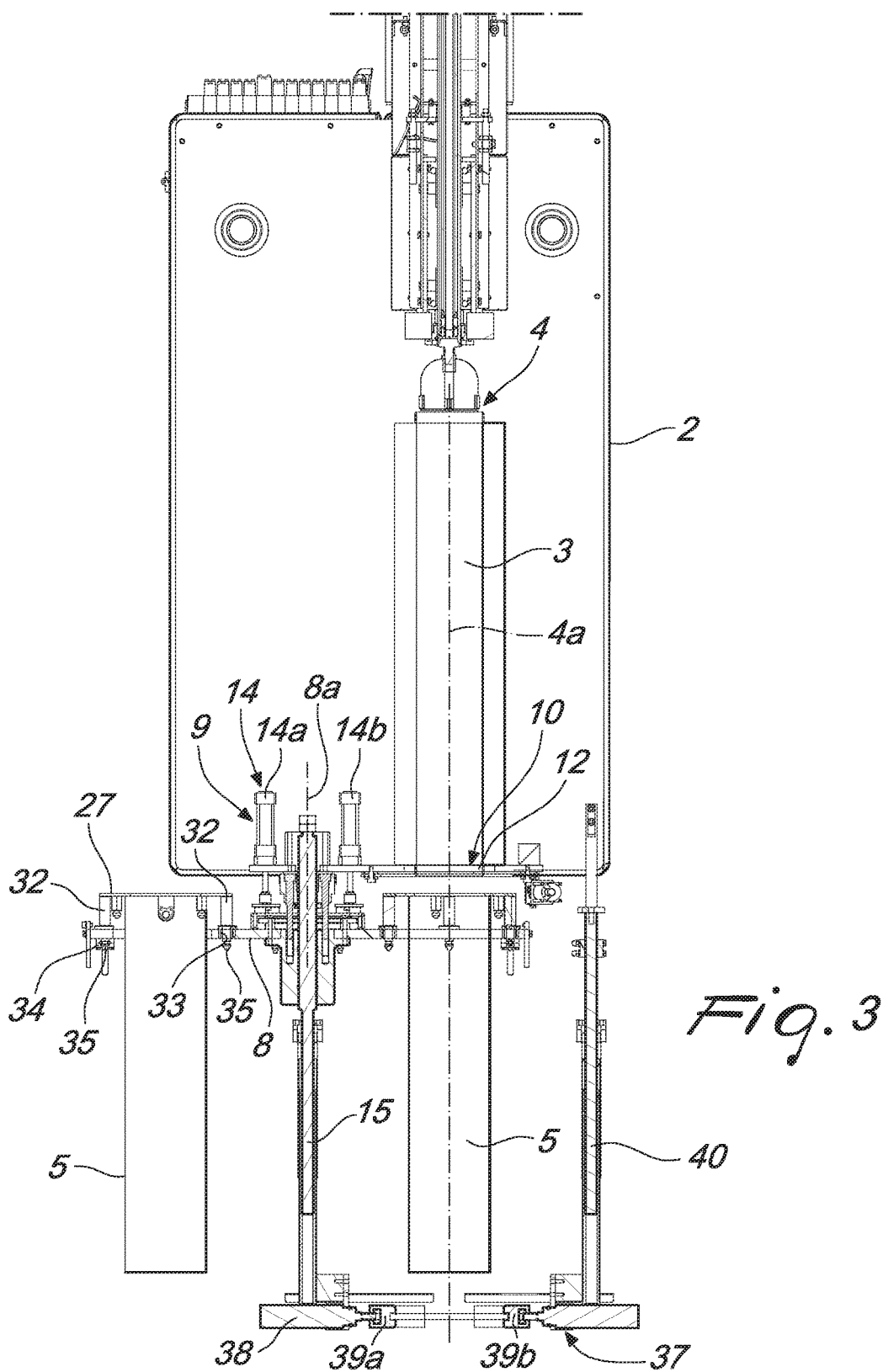
FIG. 3 is a sectional view, similar to FIG. 2 but with a stuffing tube in the working position shown in the condition of mutual disengagement from a connecting element.

Conveniently, the braking means 37 can be moved slidingly on command along a direction that is substantially parallel to the advancement direction 4*a* of the product, so as to be able to pass from an active condition, shown for example in FIG. 2, in which they are adapted to brake the tubular casing 6 supported by the stuffing tube 5 in the working position, at least when the latter is in the condition of mutual coupling with the connecting element 10, to an inactive condition, shown for example in FIG. 3, which is spaced axially with respect to the active condition, in a direction that is opposite to the forming die 3, in order to allow the rotation of the tube changer body 8 about its own rotation axis 8*a*, after the stuffing tube 5 in the working position and the connecting element 10 have been moved to the mutual disengagement condition, and vice versa.

In greater detail, the braking means 37 are supported by a frame 38 and are for example constituted by a pair of jaws 39*a*, 39*b*, which are intended to act on mutually opposite sides with respect to the stuffing tube 5 in the working position.

Conveniently, the frame 38 is supported so that it can slide by the supporting shaft 15 and optionally also by an additional guiding shaft 40, which is arranged opposite the supporting shaft 15.

At least one linear actuator 41 acts between the frame 38 and the base framework 2 and allows to translate the frame 38 and therefore the braking means 37 along the supporting shaft 15 between said active condition and said inactive condition. More preferably, there are two linear actuators 41, one acting between the frame 38 and the supporting shaft 15 and the other one acting between the frame 38 and the guiding shaft 40.

Figure 10:
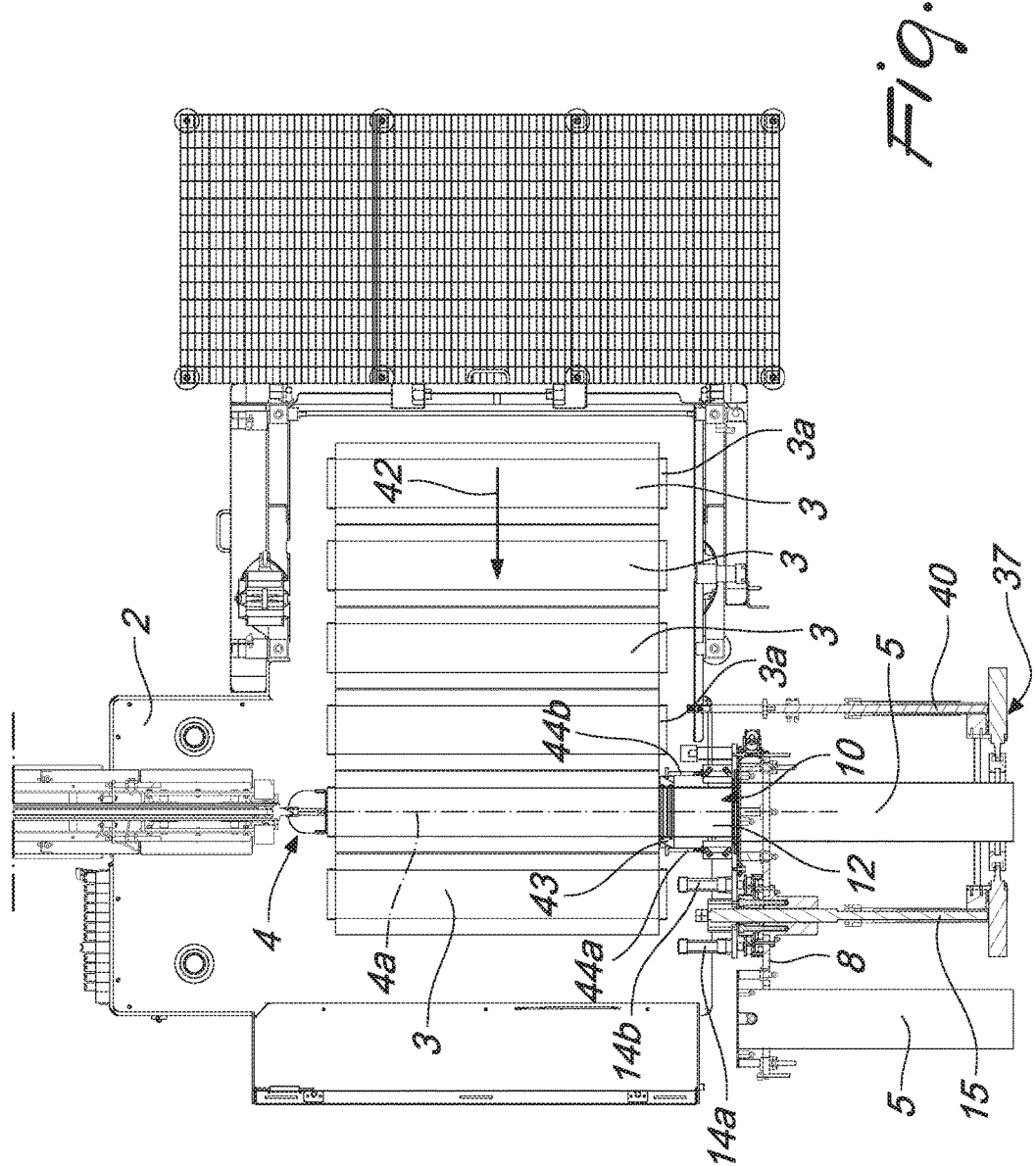
FIG. 10 is a schematic sectional view, taken along a substantially horizontal plane, of a different embodiment of the machine according to the invention.
Figure 11:
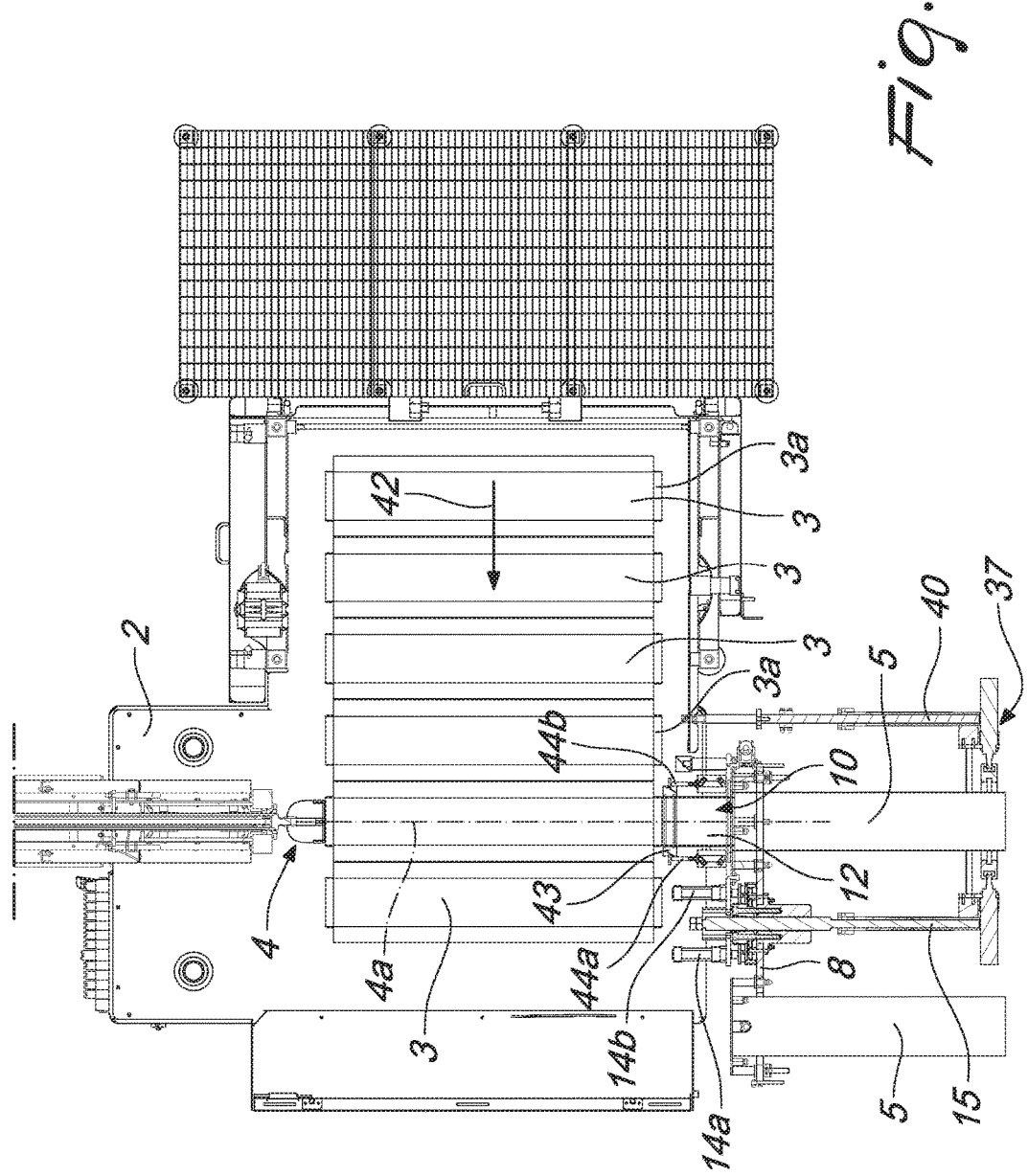
FIG. 11 is a view, similar to the view of FIG. 10, in which however a connecting ring is shown in a retracted disengagement condition.

For the sake of completeness, with reference to the embodiment of FIGS. 10 and 11, it should be added that the forming die 3 can be moved by conveyance means, constituted for example by a belt conveyor or the like, along a movement direction 42 in order to allow its replacement with other forming dies 3, already loaded with product and intended to be moved in each instance into the region of action of the pusher 4 by said conveyance means.

In this case, conveniently there are means for removable sealed connection between the forming dies 3 and the connecting element 10, which allow to connect detachably the forming die 3 that in each instance is in the region of action of the pusher 4 to the connecting element 10 and more particularly to the sleeve 12.

In detail, such sealed removable connection means comprise a connecting ring 43, which can move along the axis of the connecting element 10 in order to pass from an advanced connecting condition, visible in FIG. 10, in which it straddles the connecting element 10 and a tubular portion 3a of the forming die 3 that is arranged in the region of action of the pusher 4, so as to create a sealed connection between the forming die 3 and the connecting element 10, to a retracted disengagement condition, shown in particular in FIG. 11, in which it is uncoupled from the forming die 3 and more particularly from its tubular portion 3a, in order to allow its movement on the part of the conveyance means.

The movement of the connecting ring 43 between the advanced connecting condition and the retracted disengagement condition is conveniently actuated by means of a pair of actuation cylinders 44a and 44b, which act between the connecting ring 43 and the base framework 2.

Operation of the machine according to the invention is as follows.

With reference to the first embodiment, starting from a situation in which the sleeve 12 is inserted axially in the stuffing tube 5 that at that moment is in the working position, the movement cylinders 13a, 13b are activated so as to extract the sleeve 12 from the stuffing tube 5 in the working position, once the tubular casing 6 loaded on the stuffing tube 5 that is in the working position has been depleted.

At this point, the means 11 for turning the tube changer body 8 are activated so as to move to the working position the stuffing tube 5 that is in the resting position and has a new tubular casing 6, ready to be used, already loaded thereon.

Once the stuffing tube 5 that was in the resting position has reached the working position, the rotation of the tube changer body 8 is stopped, as a consequence of a stop signal that arrives for example from the sensor 36, and the movement cylinders 13a and 13b are activated again so as to insert the sleeve 12 in the new stuffing tube in the working position.

The stuffing tube 5 that previously was in the working position can instead reach the resting position, where it can be loaded again with another tubular casing 6 or be removed from the tube changer body 8 and replaced with another stuffing tube 5 that is already loaded with a tubular casing 6.

With reference to the other embodiment described and illustrated in particular in FIGS. 2 and 3, once the tubular casing 6 has been depleted on the stuffing tube 5 in the working position, in order to replace the stuffing tube 5 in the working position with the stuffing tube 5 that is in the resting position and has been loaded beforehand with a new tubular casing 6, initially the actuator means 30 of the retention ring 24 are activated so as to move the retention ring 24 from the condition of engagement with the raised portions 29 of the flange 27 of the stuffing tube 5 in the working position to its disengagement condition, in which its engagement protrusions 26 are arranged at the recesses 28 of the flange 27, so as to release the stuffing tube 5 from locking to the wall 25.

At this point the actuation cylinders 14a and 14b are activated so as to produce a movement of the tube changer body 8 along the supporting shaft 15, which causes the spacing, with consequent disengagement, of the stuffing tube 5 in the working position from the connecting element 10.

Furthermore, the linear actuators 41 are activated in order to move the braking means 37 into their inactive condition.

In this situation, the means 11 for turning the tube changer body 8 are activated until the stuffing tube 5 that is in the resting position is brought to the working position.

More particularly, the actuation motor 18 is activated so as to turn the pulley 16, which, by remaining rotationally integral with the tube changer body 8 by way of the connection pins 21, entrains with itself in rotation also the tube changer body 8.

The rotation of the tube changer body 8 continues at least until the sensor 36 detects the presence of a stuffing tube 5 in the working position. Upon detection of a new stuffing tube 5 in the working position, the sensor 36 commands the stopping of the actuation motor 18, so as to stop the rotation of the tube changer body 8.

At this point the actuation cylinders 14a, 14b are activated again so as to produce a translational motion of the tube changer body 8 along the supporting shaft 15 that allows to move the new stuffing tube 5 to the working position in a condition of mutual coupling with the connecting element 10.

Once this condition has been reached, the actuation means 30 are activated so as to move the retention ring 24 from the disengagement condition to the engagement condition, so as to lock the new stuffing tube 5 in the working position to the wall 25 and therefore to the base framework 2.

The linear actuators 41 are then also activated so as to return the braking means 37 to their active condition.

After the rotation of the tube changer body 8, the stuffing tube 5 that previously was in the working position is moved to the resting position, where it can be reloaded with a new tubular casing 6, optionally after uncoupling it from the tube changer body 8, by way of the extraction of its engagement pins 32 from the respective receptacles 31, so as to prepare it for a new work cycle or replacing it with another stuffing tube on which a tubular casing 6 has already been loaded.

With reference to the embodiment of FIG. 10, once the food product contained in the forming die 3 that is in the region of action of the pusher 4 has been stuffed and once the pusher 4 has been returned to its initial position, the forming die 3 that is in the region of action of the pusher 4 is replaced automatically by another forming die 3, loaded with a new product to be made into sausages.

In order to perform this replacement of the forming die 3, the connecting ring 43 is moved from the advanced connecting condition to the retracted disengagement condition by way of the activation of the actuation cylinders 44a and 44b. Then the means for the conveyance of the forming dies 3 are activated and position another forming die 3 in the region of action of the pusher 4, moving away the previous one.

Once a new forming die 3 has been positioned in the region of action of the pusher 4, the actuation cylinders 44a and 44b are activated in order to move the connecting ring 43 to the advanced connecting condition, so as to make it straddle the connecting element 10 and the tubular portion 3a of the new forming die 3 in the region of action of the pusher 4.

At this point it is possible to activate the pusher 4 in order to stuff the product contained in the new forming die 3.

From what has been described above it is evident that the invention is capable of achieving fully the intended aim, since it allows to obtain a rapid changing of the stuffing tubes, once their reserve of tubular casing has been depleted, at the same time ensuring a valid seal between the forming die and the stuffing tubes, so as to prevent losses of product.

All the characteristics of the invention indicated above as advantageous, convenient or the like may also be omitted or be replaced with equivalents.

The individual characteristics described with reference to general teachings or to particular embodiments may all be present in other embodiments or may replace characteristics in these embodiments.

The invention thus conceived is susceptible of numerous modifications and variations, all of which are within the scope of the appended claims.

Figure 12:
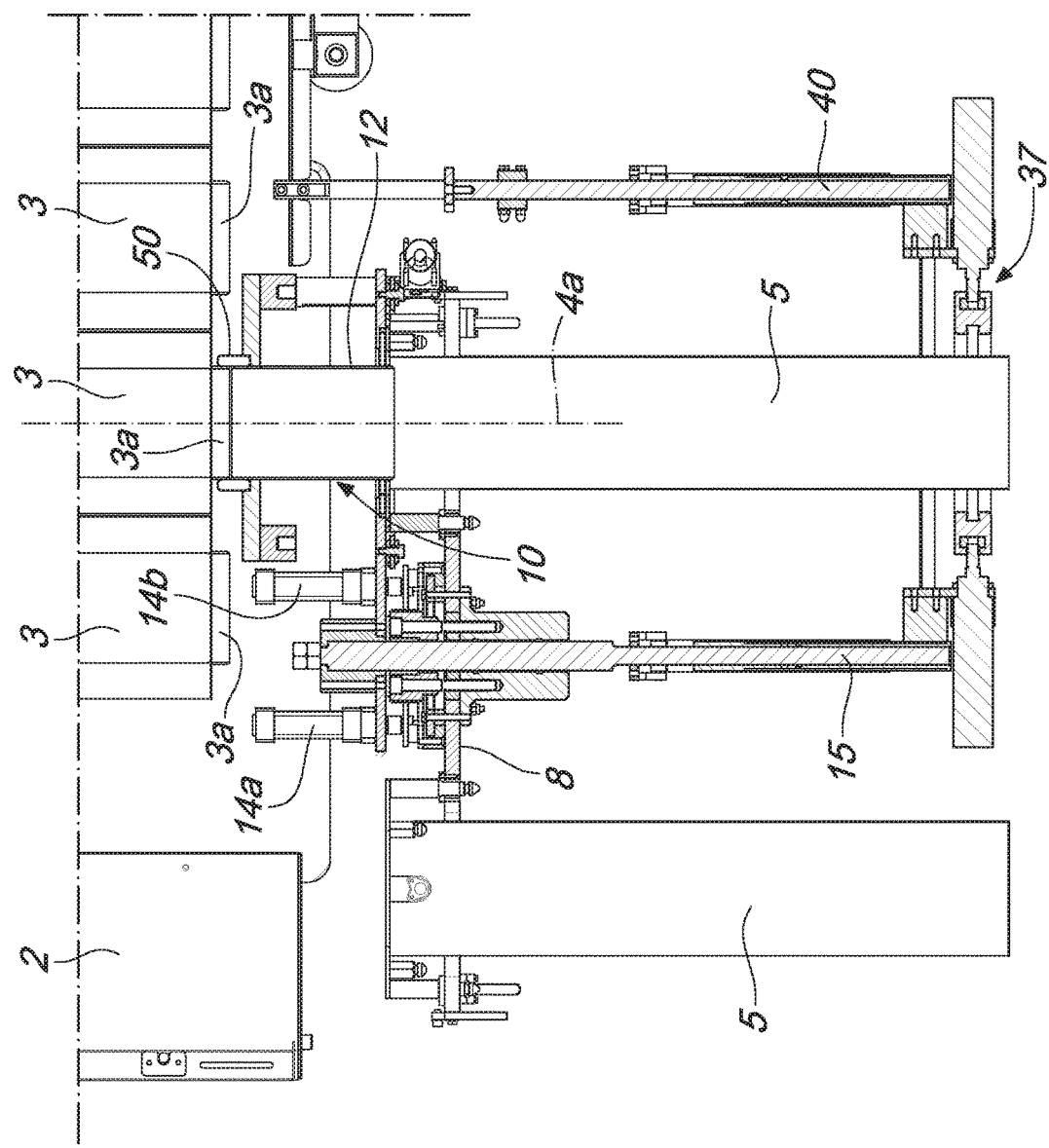
FIG. 12 is a schematic sectional view, taken along a substantially horizontal plane, of a further embodiment of the machine according to the invention, in which there is an expandable gasket, shown in the extended condition.
Figure 13:
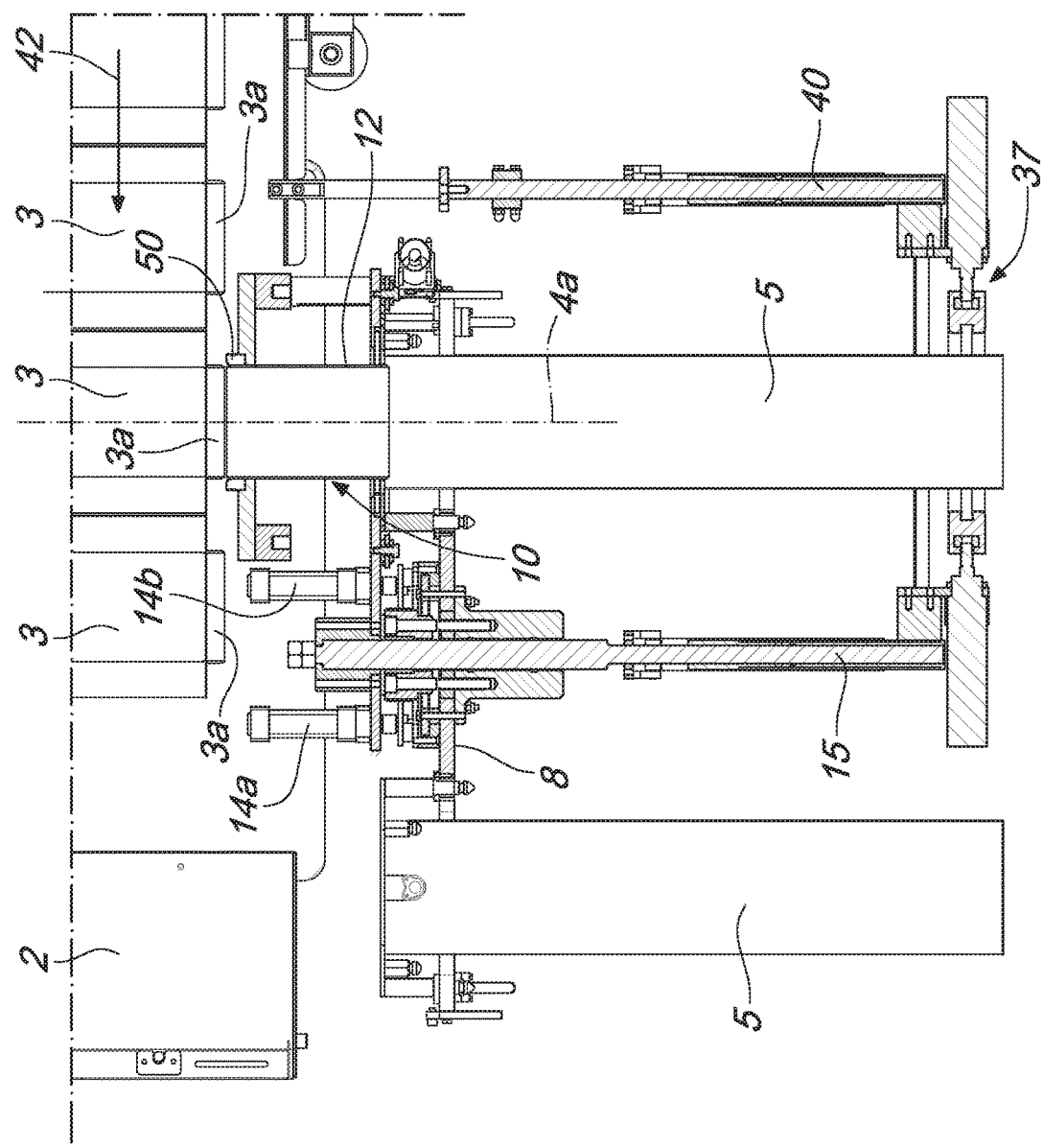
FIG. 13 is a view, similar to FIG. 12, in which however the expandable gasket is shown in the retracted condition.

Thus, for example, as shown in FIGS. 12 and 13, it is also possible to provide, at least between the stuffing tube 5 in the working position and the forming die 3 that contains the product to be stuffed, at least one expandable gasket 50, which allows to connect detachably to each other the stuffing tube 5 and the forming die 3 that are in the region of action of the pusher 4.

Preferably, the expandable gasket 50 is adapted to pass from an extended condition, shown in FIG. 12, in which it provides, between the stuffing tube 5 in the working position and the forming die 3, a sealed connection with respect to the product entrained by the pusher 4, to a retracted condition, shown in FIG. 13, in which a space is provided between the stuffing tube 5 in the working position and the forming die 3, so as to allow the movement of the tube changer body 8 or of the forming die 3, and vice versa.

In greater detail, according to the embodiment of FIGS. 12 and 13, the expandable gasket 50 provides an alternative embodiment of the sealed removable connection means cited above.

In particular, the expandable gasket 50 has a substantially annular shape and is advantageously associated, at a first axial end thereof, with the connecting element 10 that is intended to be connected to the stuffing tube 5 in the working position. More particularly, the expandable gasket 50 is fixed, at its said first axial end, to the sleeve 12.

Advantageously, the expandable gasket 50 is inflatable by way of means for injecting pressurized air, not shown, which are connected to an air chamber defined inside such expandable gasket in order to allow its transition from the retracted condition to the expanded condition.

In particular, in passing from the retracted condition, in which it is deflated, to the extended condition, in which it is inflated with air, the expandable gasket 50 becomes elongated, with the consequence that its second axial end is translated, substantially parallel to the advancement direction 4a of the product to be stuffed, toward a tubular portion 3a that is connected to the forming die 3 that is in the region of action of the pusher 4, so as to engage its lateral surface and thus provide a sealed connection between the forming die 3 and the stuffing tube 5 in the working position, as shown in FIG. 12.

When one wishes to bring another forming die 3 into the region of action of the pusher 4, air is made to exit from the air chamber of the expandable gasket 50, so that it can return to the retracted condition, consequently achieving its disengagement from the tubular portion 3a of the forming die 3 that at that moment is in the region of action of the pusher 4, so as to allow the movement of the forming dies 3 by the conveyance means, as in the situation shown in FIG. 13.

As an alternative, by means of an expandable gasket 50 it is possible to provide optionally also the removable connection between a fixed forming die 3 and the stuffing tube 5 in the working position.

In this case, the expandable gasket 50 is fixed at a first axial end to the forming die 3, while its second axial end can translate, as a consequence of its transition from the retracted condition to the extended condition, toward the stuffing tube 5 that is arranged in the working position, until it engages it hermetically.

In this manner, when the expandable gasket 50 is in the extended condition, for example due to its inflation by way of the means for injecting air under pressure, one achieves a hermetic connection, with respect to the product to be made into sausages, between the forming die 3 and the stuffing tube 5 in the working position, while when the expandable gasket 50 is in the retracted condition, as a consequence of its deflation, the stuffing tube 5 in the working position is disengaged from the expandable gasket 50, thus creating between the forming die 3 and the stuffing tube 5 in the working position a space that allows to move the tube changer body 8 and consequently replace the stuffing tube 5 in the working position with another stuffing tube 5 loaded with a new tubular casing 6.

It should be noted that in this case also the translation of the second end from the expandable gasket 50, as a consequence of the transition of the latter between the extended condition and the retracted condition, occurs along a direction that is substantially parallel to the advancement direction 4a of the product to be made into sausages.

In practice, the materials used, so long as they are compatible with the specific use, as well as the dimensions and shapes, may be any according to requirements.

All the details may further be replaced with other technically equivalent elements.

The disclosures in Italian Patent Application No. VR2015A000052 (102015902342207) from which this application claims priority are incorporated herein by reference.

What is claimed is:

1. An automatic stuffing machine for food products, comprising a base framework supporting at least one forming die of a product to be stuffed and a pusher adapted to cause a translation of the formed product, along an advancement direction, through a stuffing tube that supports externally at least one tubular casing, until the product exits from the stuffing tube, there being at least one tube changer body that supports at least two stuffing tubes and can be actuated to move with respect to said base framework, in order to bring, in each instance, one of said stuffing tubes to a working position, in which said one of said stuffing tubes is located substantially at the area of action of said pusher, and at least one other stuffing tube to a resting position, said at least one other stuffing tube is adapted to allow to load a new tubular casing, and wherein the automatic stuffing machine further comprises elements for removable joining between said at least one forming die and at least the stuffing tube arranged in the working position, said elements for removable joining are adapted to pass from an active condition, in which said elements for removable joining provide a continuous sealed connection with respect to the product to be stuffed between said forming die and the stuffing tube arranged in the working position, to an inactive condition, in which said elements for removable joining define a space between said forming die and the stuffing tube arranged in the working position, in order to allow the movement of said tube changer body with respect to said base framework, and vice versa.

2. The machine according to claim 1, further comprising means for relative movement, along a direction that is substantially parallel to said advancement direction, between at least one portion of the stuffing tube arranged in working position and at least one connecting element, said at least one connecting element is associated with said forming die, in order to move the stuffing tube arranged in the working position and said connecting element from a condition of mutual coupling, in order to obtain a continuous sealed connection between said forming die and the stuffing tube arranged in the working position, to a condition of mutual disengagement, with axial spacing from each other, in order to allow the movement of said tube changer body with respect to said base framework, and vice versa.

3. The machine according to claim 2, wherein in said condition of mutual coupling said at least one portion of the stuffing tube in said working position and said at least one portion of said connecting element are axially inserted into each other.

4. The machine according to claim 2, wherein said tube changer body is mounted so that said tube changer body can rotate on said base framework about a rotation axis that is substantially parallel to said advancement direction, means being provided for turning said tube changer body with respect to said base framework, said stuffing tubes being arranged around said rotation axis.

5. The machine according to claim. 4, wherein said tube changer body is mounted so that said tube changer body can rotate about a supporting shaft that is substantially parallel to said advancement direction, said turning means comprising a pulley that is mounted coaxially and rotatably with respect to said supporting shaft and is connected integrally in rotation to said tube changer body, said pulley being engaged with a motion transmission element that is functionally connected to an actuation motor.

6. The machine according to claim 5, wherein said tube changer body can slide along said supporting shaft, said axial movement means comprising at least one actuation cylinder that acts between said tube changer body and said base framework, in order to cause the sliding of said tube changer body along said supporting shaft toward or away from said pulley, means for kinematic connection to said tube changer body being associated with said pulley and being adapted to connect integrally in rotation said tube changer body to said pulley, allowing said tube changer body to slide with respect to said pulley along said supporting shaft.

7. The machine according to claim 4, further comprising at least one sensor adapted to detect the arrangement of one of said stuffing tubes in the working position following the actuation in motion of said tube changer body with respect to said base framework, said at least one sensor being functionally connected to said turning means in order to actuate the halting of said turning means when one of said stuffing tubes reaches said working position.

8. The machine according to claim 4, comprising means for braking the tubular casing supported by the stuffing tube in the working position, said braking means being movable slidingly on command along a direction that is substantially parallel to said advancement direction, in order to pass from an active condition, in which they are adapted to brake the tubular casing supported by the stuffing tube in the working position, at least when the stuffing tube in the working position and said connecting element are in said mutually coupled condition, to an inactive condition, spaced axially with respect to said working condition, in order to allow the rotation of said tube changer body about said rotation axis, with the stuffing tube in the working position and said connecting element in said mutual disengagement condition, and vice versa.

9. The machine according to claim 2, wherein said connecting element comprises a sleeve that is substantially coaxial to said advancement direction.

10. The machine according to claim 9, wherein said relative movement means comprise means for axial translation of said sleeve with respect to said forming die along a direction that is substantially parallel to said advancement direction.

11. The machine according to claim 2, wherein said relative movement means comprise means for the axial movement of said tube changer body with respect to said base framework along a direction that is substantially parallel to said advancement direction.

12. The machine according to claim 2, further comprising removable locking means adapted to removably lock the stuffing tube arranged in said working position with respect to said base framework, with the stuffing tube in the working position and said connecting element in said mutually coupled condition.

13. The machine according to claim 12, wherein said removable locking means comprise a retention ring that is arranged substantially coaxially to said advancement direction and is supported so that it can rotate about its axis by a wall that is fixed to said base framework, said retention ring being provided internally with a plurality of engagement protrusions that are mutually spaced angularly around the axis of said retention ring, a respective flange being fixed to each one of said stuffing tubes and being provided, along its outer perimeter, with recesses alternated with raised portions, said retention ring being actuatable in rotation by actuator means in order to pass from a disengagement condition, in which said engagement protrusions are arranged at said recesses, in order to allow translational motion, along a direction that is substantially parallel to said advancement direction, of the stuffing tube arranged in the working position between said mutually coupled condition and said condition of mutual disengagement with respect to said connecting element, to an engagement condition, in which said engagement protrusions are misaligned with respect to said recesses, in order to allow, with the stuffing tube arranged in the working position and said connecting element in said mutually coupled condition, the locking of the flange of the stuffing tube in the working position between said retention ring and said wall, and vice versa.

14. The machine according to claim 2, further comprising at least one expandable gasket adapted to mutually connect detachably said forming die and the stuffing tube in the working position.

15. The machine according to claim 1, wherein said stuffing tubes are coupled detachably to said tube changer body in order to allow, when said elements for removable joining are in said inactive condition, replacement of said stuffing tubes with another stuffing tube loaded with a new tubular casing.

* * * * *